June 30, 1970  J. A. MELENRIC  3,517,510
SELF-STARTING VALVELESS RESONANT PULSE-JET ENGINE AND METHOD
Filed March 11, 1968  2 Sheets-Sheet 1
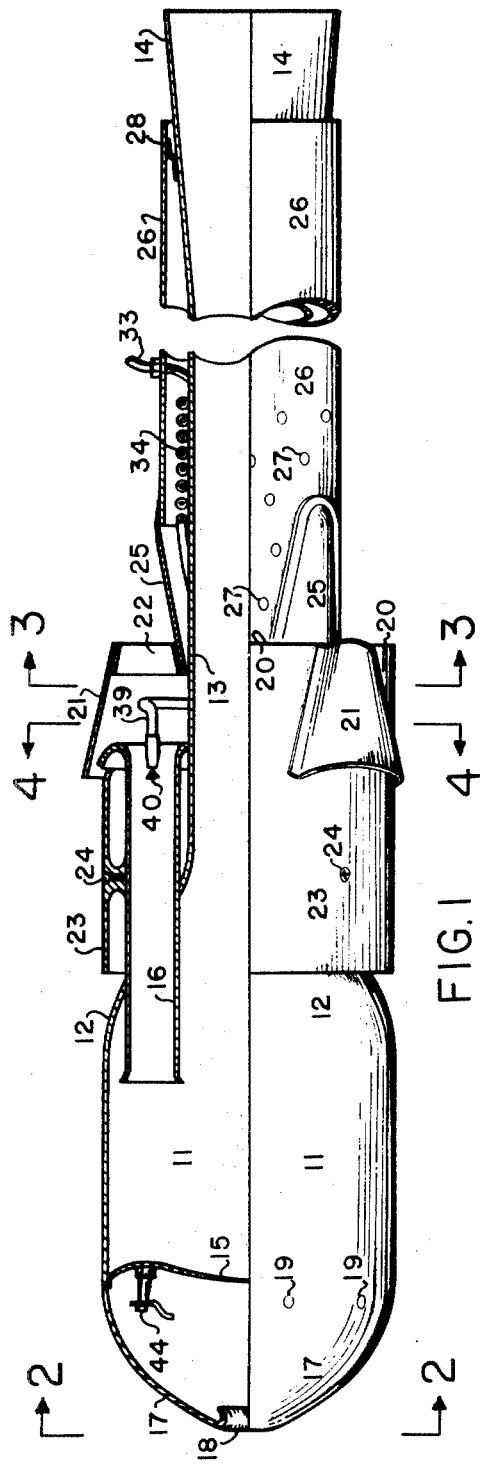
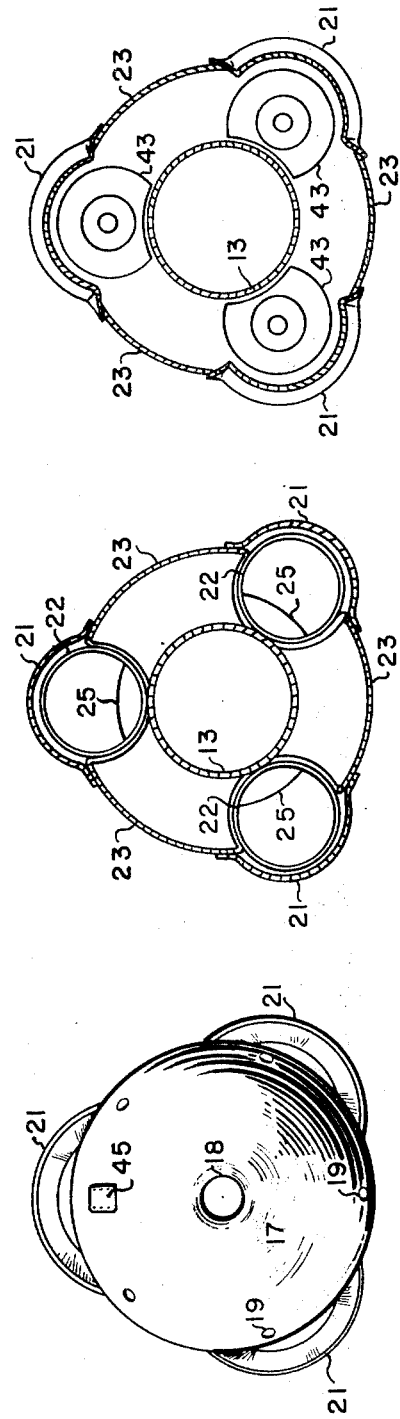
INVENTOR
JOHN ALDEN MELENRIC
BY
ATTORNEY June 30, 1970          J. A. MELENRIC          3,517,510

SELF-STARTING VALVELESS RESONANT PULSE-JET ENGINE AND METHOD

Filed March 11, 1968          2 Sheets-Sheet 2

INVENTOR

JOHN ALDEN MELENRIC

BY

ATTORNEY

United States Patent Office 3,517,510
Patented June 30, 1970

3,517,510
SELF-STARTING VALVELESS RESONANT PULSE-JET ENGINE AND METHOD
John A. Melenric, 409 E. Lane, Kerrville, Tex. 78028
Filed Mar. 11, 1968, Ser. No. 712,193
Int. Cl. F02k 7/04
U.S. Cl. 60—249                                    9 Claims

ABSTRACT OF THE DISCLOSURE

A self-starting resonant valveless pulse-jet engine comprising a substantially cylindrical combustion chamber, a reduction cone and exhaust tube. A multiplicity of reverse flow air and fuel inlet tubes are equiangularly spaced and project through the reduction cone into the combustion chamber. Highly volatile fuels are injected under high pressure into the inlet tubes deflecting the mixture against the combustion chamber forward wall thereby creating a homogenous mixture which is spark ignited; creating a self-sustained resonant combustion cycle. Configuration, arrangement of components and dimensional proportions accomplish maximum thrust heretofore not accomplished in valveless pulse-jet engines, including a fueling method.

---

This invention relates to an improved valveless pulse-jet engine utilizing liquefied gaseous fuels such as propane, butane or hydrogen. The engine is self-starting and may be shut down and restarted in flight. The device is particularly adapted for powering sail-planes.

To appreciate the significance of this invention a general knowledge of prior developments success achieved and criticality of proportions, arrangement of components and theory of operation of a resonant pulse-jet engine is desirable. An excellent publication in this regard arises out of Project Squid, Department of the Navy, Research Project. Technical Memorandum No. PR.-4 concerning the background and development of the German V-1 Ing. Guenther Dietrich translated by A. Kahane, June 30, 1948, Princeton University, and Technical Memorandum No. CAL-27 by Joseph G. Logan, Jr., May 1949, by Cornell Aeronautical Laboratories, accentuates some of the tremendous significances of small structural changes and relative dimensions and arrangements of components.

The preferred embodiment of this invention was arrived at after considerable designed study and experimentation to create a pulse-jet which was self-contained and would start with no external assistance such as blowers or launched catapults. Valve pulse-jets such as model airplane engines have an extremely short operating life span such as 15 minutes. The highly developed flat or flap valves of the V-1 type power plant has a useful life of an hour or two. This short useful life makes such devices undesirable for a continuous use or reuse in a glider power plant.

Valveless pulse-jets such as the Schuberts or SNECMA design produce less than the desired thrust and do not possess the effective start and restart features accomplished by this invention.

This invention utilizes a cylindrical combustion chamber including a substantially flat forward wall. By arranging the air and fuel inlet tubes equiangularly and concentrically projecting into the combustion chamber from the rear in conjunction with utilizing liquified gaseous high pressure fuel injected into the inlet tubes through supersonic nozzles, a high intake air and fuel flow is obtained. The utilization of a throttle fuel valve adapted to selectively feed either the vapor fuel or liquid fuel from the fuel tank or a mixture of both self-starting operation is achieved. Ignition and initial operation is accomplished by utilizing the vapor fuel only, liquid is added to cool the fuel air mixture and increase its density. Maximum thrust will be obtained under liquid fuel operating conditions. A heat exchange in contact with the exhaust tube is provided in the liquid fuel line to increase the vaporization, accelerate fuel flow and enhance the efficiency of the system. By selecting optimum dimensions of the structural components in conjunction with this novel combination outstanding static thrust is obtained exceeding by approximately two to one the prior art.

An object was to provide a light, inexpensive, self-contained, self-starting pulse-jet engine.

Another object was to provide a flight propulsion system possessing flexible operating capabilities including in flight stop and start ability.

Another object was to achieve partial throttle operating capabilities with result in fuel economy and flexibility of operation.

The principal object was to create a valveless pulse-jet engine of improved fuel and air intake ability resulting in higher thrust per cross sectional area of the exhaust tube.

Other objects and advantages will become apparent from a study of the following detailed description and explanation of operating characteristics in conjunction with the various views wherein like referenced characters refer to identical or equivalent components throughout the various views.

FIG. 1 is a side elevation view partially in cross section.

FIG. 2 is a front elevation view taken substantially on line 2—2 of FIG. 1 looking in the direction of the arrows.

FIG. 3 is a fragmentary sectional view taken substantially on line 3—3 of FIG. 1 looking in the direction of the arrows.

FIG. 4 is a fragmentary sectional view taken substantially on line 4—4 of FIG. 1 looking in the direction of the arrows.

Figures 5, 6:
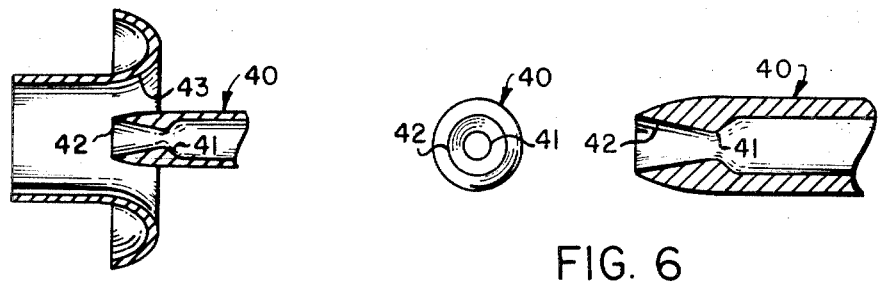
FIG. 5 is a fragmented cross-sectional view of one of the air and fuel intake tubes also showing the supersonic fuel nozzle in cross-section.
FIG. 6 is a front view of a supersonic fuel nozzle as well as an elongated cross-sectional view of the said nozzle.

The device of this invention may be constructed from various metals or alloys, however, in the development work of the preferred embodiment, 321 or 347 type stainless steel AMS spec 5510, 5512 or 5570 was used primarily because of its strength and ability to withstand heat. In assembling the various components, a variety of conventional securing or attaching means may be used, however, heliarc welding was primarily used in the construction. Referring to FIG. 1, the device can be said to be constructed starting with the substantially cylindrical combustion chamber 11. Aft of the combustion chamber 11 is the combustion chamber reduction cone 12, the prolongation of which is the exhaust tube 13, which flares out at its aft end into the exhaust tube nozzle 14. Secured at the forward end of the combustion chamber 11 is a combustion chamber forward wall 15. This wall is slightly arced to prevent fatigue of the metal, however, the desired flow characteristic dictates a wall substantially at right angles with the exhaust tube 13.

Projecting into the combustion chamber 11 from the rear is equiangularly dispersed around the chamber a multiplicity of air and fuel inlet tubes 16. The axis of the tubes are substantially parallel with the axis of the exhaust tube 13. These tubes are welded to the combustion chamber reduction cone 12 and the exhaust tube 13. To enhance the appearance of the device and improve the aerodynamic configuration, various fairing structural members are employed. Secured to the forward end of the combustion chamber 11 is a nose cone 17. In the forward end of the cone is a cooling vent 18. One or more air exit vents 19 are provided to dissipate the heat from the combustion chamber forward wall 15. The principal structural member in the mid-section of the engine is the vertical support plate 20. This plate is welded to the exhaust tube 13 and to the plate is secured the fairing components and the air scoops 21 welded to exhaust end of the air scoops are air scoop support rings 22. Referring now to FIGS. 1, 2, 3, and 4, forward of the vertical support plate 20 and secured to it is the outer circular fairing 23. This fairing does not contact the combustion chamber reduction cone 12 thus permitting air to flow around and into the inlet tube 16 as well as the air scoops 21; suitable fastening means should be provided to secure the outer circular fairing 23 to the air and fuel inlet tubes 16 such as connecting brackets 24. Aft of the vertical support plate 20 and in prolongation of the inlet tube 16 are secondary exhaust deflector plates 25. These plates fair into the exhaust tube fairing 26 which encircles the exhaust tube 13 and is spaced from said tube to permit the flow of cooling air between the fairing 26 and the tube 13. This exhaust tube fairing 26 is provided air inlet holes 27 which permit cooling air to enter the space between the fairing 26 and the tube 13. Suitable support brackets should be provided to secure this fairing 26 adjacent the exhaust tube nozzle 14 such as securing bracket 28.

Figure 7:
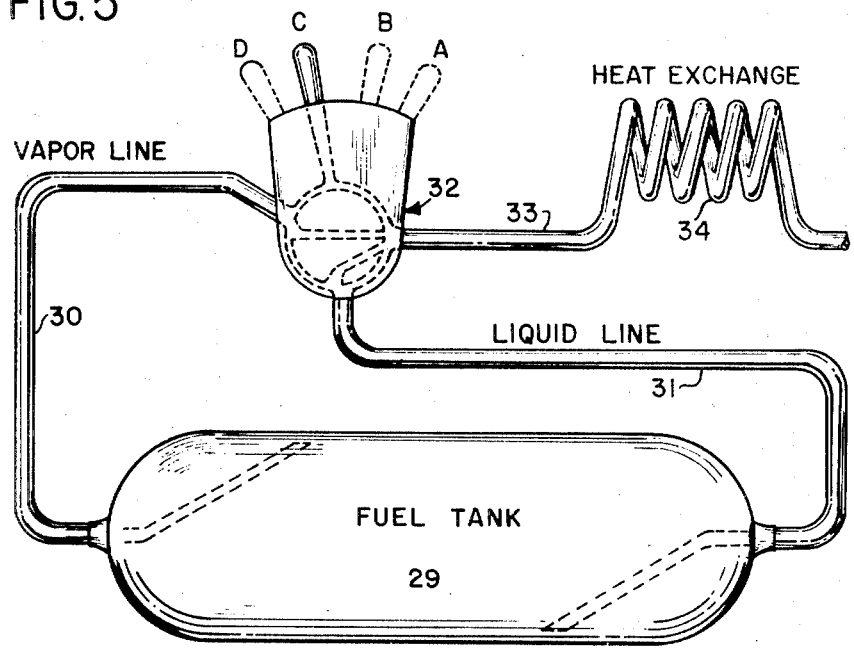
FIG. 7 is principally a schematic view illustrating the fuel tank, fuel lines, throttle fuel valve, and the heat exchange.
Figure 8:
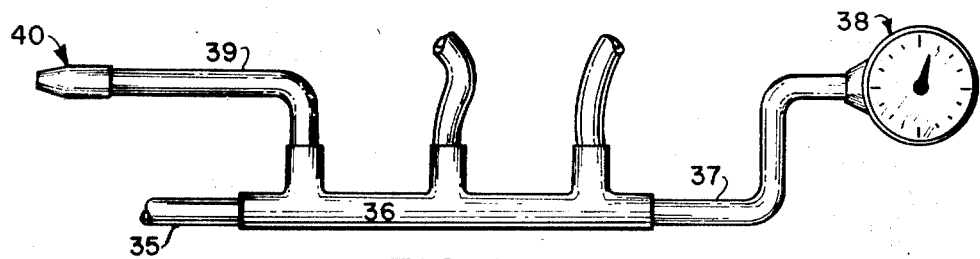
FIG. 8 is a schematic view of a portion of the fuel distribution system depicting the fuel distribution block, nozzle fuel lines and fuel pressure gauges.

Referring to FIG. 7 in conjunction with the other views, the operation of the fueling means can be illustrated. A fuel tank 29 capable of retaining liquified gaseous fuel is required. A vapor fuel line 30 feeds from the top of the tank 29 and a liquid fuel line 31 feeds from the bottom of the tank. These two lines lead into the throttle fuel valve 32. When the throttle fuel valve 32 is opened to one of the feed positions, fuel flows through the heat exchange fuel line 33 to the heat exchange 34. Referring to FIG. 1, the heat exchange is coiled around the exhaust tube 13 and after heat transfer the fuel flows through the distribution block fuel line 35 to the distribution block 36, FIG. 8. For convenience of control by the pilot, the fuel pressure line 37 is connected to the distribution block 35 and leads to a fuel pressure gauge 38 which is positioned in the cockpit of the glider. From the distribution block the fuel flows through the fuel nozzle fuel line 39 to the supersonic fuel nozzle 40.

Referring to FIG. 1 and for more details to FIG. 5 and 6, these fuel nozzles 40 are constructed with a minimum section 41 and a nozzle flare 42 which results in a maximum flow of vapor fuel being reached without regard to the pressure in the system. Experimental designs show that if a minimum section 41 is selected providing sixty percent (60%) power utilizing vapor fuel only maximum power will be obtained by adding liquid fuel in the system. It is highly important that the supersonic fuel nozzle 40 be positioned in the air and fuel inlet tube 16 at the exact point where the inlet tube bellmouth 43 ends. This is illustrated in FIG. 5. Any variation of this position will result in reduced performance. Referring to FIG. 1 in prolongation of the axis of one of the air and fuel inlet tubes 16 positioned in the combustion chamber forward wall 15 should be a spark plug 44 which may be connected to the battery powered vibrator (not shown) which may be throttle activated. A spark plug access cover plate 45 should be provided as in FIG. 2 with suitable fastening means.

In placing the device in operation, the throttle fuel valve 32 is moved from the off position A to the vapor fuel position B. The vapor fuel flows to and is injected under pressure to the fuel nozzle 40. This high pressure jet pulls air with the fuel into the combustion chamber 11. The relatively low viscosity residue of burned gases at these elevated temperatures tends to contain the fuel air mixture. The high velocity fuel air mixture moves through the burned gases in a rather small cone of dispersion until it strikes the forward wall 15. The arrangement of the various components causes the air and fuel mixture to move forward through the combustion chamber 11 and strike the combustion chamber forward wall 15 where it tends to propagate adjacent the said wall. The utilization of multiple air and fuel inlet tubes 16 approximately equiangularly spaced around the combustion chamber results in a homogenous fuel air mixture in the forward part of the combustion chamber 11. The characteristic fuel flow continues during cyclic or rhythmic operation of the device in the initial and subsequent cycles. The spark plug 44 is fired to ignite the mixture after ignition is achieved and operation of the device becomes stabilized the ignition should be turned off. No timing is required and a conventional vibrator ignition system for firing the plug is adequate. When ignition occurs, there is a rise in pressure and temperature in the combustion chamber 11. A shock wave followed by a pressure wave moves aft through the air fuel inlet tube 16 and along the larger exhaust tube 13. Inside the combustion chamber 11 is created what amounts to an isentropic reaction causing a resulting temperature and pressure drop creating a result in which approximately thirty percent (30%) of the volume in the combustion chamber is momentarily evacuated. The design of the engine is such that the fuel and air inlet tubes 16 are acoustically tuned with the combustion chamber 11 and the exhaust tube combination. Experiments have proved that a ratio of their relative length of approximately one to four is highly satisfactory. As the shock and pressure wave continues to propagate aft in the device the collapsed pressure in the combustion chamber 11 causes fuel and air to be injected into the system through the air and fuel inlet tubes 16. The efficiency of the intake is enhanced by the position and physical characteristic of the fuel nozzle 40 injecting within the inlet tube 16. This fresh fuel charge bores through the combusted gases striking the forward wall 15 and is dispersed in the vicinity creating a new and fresh combustible mixture in the forward area of the combustion chamber 11 where it is ignited by the remaining combustion in the combustion chamber 11, or the spark plug 44.

The device of this invention can initially operate at approximately 60% maximum power utilizing vapor fuel only, however, continuous operation with vapor fuel results in a loss of thrust when the device reaches a high operating temperature. To obtain maximum power the throttle fuel valve 32 should be moved through schematic position C, FIG. 7 where a combination of vapor and liquid fuel will flow. The valve 32 should be retained in this intermediate position only momentarily or freezing may occur. For maximum power the throttle fuel valve 32 is moved to the full on position D where only liquid fuel is fed into the system. The vaporization of these liquid fuels perceptibly cools the fuel air mixture, increases density of the charge which results in increased thrust and improved performance of the device operating under maximum power conditions.

The particular arrangement of components of this invention has resulted in a self-starting valveless pulse-jet with thrust and fuel efficiency approaching a valved pulse-jet with thrust and fuel economy characteristics approximately twice as efficient as known valveless pulse jets.

For clarity, the following relative dimensional characteristics of the preferred embodiment should be noted. If the diameter of the exhaust tube 13 is "D" the diameter of the exhaust tube nozzle should be one point four-five (1.45) "D" and the diameter of the combustion chamber two (2) "D." With reference to the proportional lengths of the components the total length of the device from the combustion chamber forward wall 15 through the exhaust tube 13 to the exhaust end of the exhaust tube nozzle 14 is "L" which equals fifteen (15) "D." The length of the air and fuel inlet tubes is equal to "L" over four (4) (L/4) and the air and fuel inlet tubes 16 are positioned in the combustion chamber reduction cone 12 in such a manner as to project into the combustion chamber 11 a distance of "L" over sixteen (L/16). It should also be noted that the total intake cross-sectional area of the multiple air intake tubes 16 should equal one-third (⅓) of the cross-sectional area of the exhaust tube 13. By the recitation of the above related dimensions, it is not intended to so limit the claims of this invention but they are recited for the purpose of disclosing in full detail the preferred embodiment which accomplishes the desired objectives as stated.

Having described the construction of my invention and its operating principles in detail, what I claim is all modifications or embodiments occurring to one skilled in the art from a study of this disclosure not departing from the inventive principles herein disclosed and within the equivalent scope of the appended claims.

I claim:

1. A self starting valveless pulse jet engine comprising:
   (a) a substantially cylindrical combustion chamber of circular cross section,
   (b) an elongated substantially cylindrical exhaust tube of circular cross section projecting aft from said combustion chamber constructed and arranged on a common axis with the axis of said conbustion chamber,
   (c) a reduction cone intermediate said combustion chamber and said exhaust tube,
   (d) a multiplicity of straight air and fuel inlet tubes constructed in a single axis configuration mounted in said reduction cone projecting into said combustion chamber, the construction and arrangement of the combustion chamber, exhaust tube, and air fuel intake tube combination places the axis of each said element substantially parallel with the axis of each other said element,
   (e) fuel supply means operably associated with said combustion chamber and,
   (f) ignition means operably associated with said combustion chamber.

2. The invention of claim 1 wherein said combustion chamber includes a substantially flat forward wall normal to the axis of said exhaust tube.

3. The invention of claim 1 wherein the said air and fuel inlet tubes are substantially equiangular positioned in said combustion chamber.

4. The invention of claim 1 wherein the said fuel supply means includes,
   (a) a fuel tank,
   (b) a fuel nozzle operably associated with said combustion chamber,
   (c) a fuel line interconnecting said fuel tank and said fuel nozzle, and
   (d) a heat exchanger located in said fuel line intermediate said fuel tank and said fuel nozzle, said heat exchanger being positioned adjacent said combustion chamber exhaust tube combination.

5. The invention of claim 1 wherein said fuel supply means includes:
   (a) fuel tank capable of retaining a liquefied gaseous fuel,
   (b) a vapor fuel line communicating with top of said fuel tank,
   (c) a liquid fuel line communicating with bottom of said fuel tank, and
   (d) a throttle fuel valve operably attached to said vapor fuel line and said liquid fuel line, said throttle fuel valve constructed in a configuration including an off position, vapor position, intermediate position and full on position, the said fuel valve constructed in the configuration so as to selectively feed gas from the top of the tank at the vapor position, a combination of gas and liquid vapor at the intermediate position, and liquid fuel from the bottom of the tank at the full on position.

6. The invention of claim 1 wherein the fuel supply means includes a convergent-divergent supersonic fuel nozzle positioned in the inlet end of said air and fuel inlet tubes.

7. The invention of claim 1 wherein,
   (a) the said air and fuel inlet tubes include an inlet tube bellmouth at their respective intake ends opposite the combustion chamber end, and
   (b) a fuel nozzle positioned in substantially the center of said bellmouth at its juncture with said air and fuel inlet tube.

8. The invention of claim 2 wherein the said ignition means includes a spark plug positioned in the said forward wall at a position substantially in prolongation of the axis of one of the said air and fuel inlet tubes.

9. The invention of claim 1 wherein the dimensional proportions are relatively:
   (a) the diameter of the combustion chamber is substantially twice the diameter of the exhaust tube,
   (b) the combustion chamber, combustion chamber reduction cone, and exhaust tube combination is substantially fifteen (15) exhaust tube diameters in length,
   (c) the length of each of the air and fuel inlet tubes is one-fourth (¼) the length of the combustion chamber, combustion chamber reduction cone, and the exhaust tube combination, and
   (d) the total cross-sectional intake area of the said air and fuel inlet tubes is one-third (⅓) of the cross-sectional area of the said exhaust tube.

References Cited

UNITED STATES PATENTS

| | | | |
|---|---|---|---|
| 2,645,906 | 7/1953 | Ryan | 62—51 |
| 2,663,142 | 12/1953 | Wilson | 60—39.71 |
| 2,795,105 | 6/1957 | Porter | 60—249 |
| 2,826,043 | 3/1958 | Simonson | 62—51 |
| 3,093,962 | 6/1963 | Gluhareff | 60—39.77 |
| 3,354,650 | 11/1967 | Malroux | 60—249 |

CARLTON R. CROYLE, Primary Examiner

D. HART, Assistant Examiner

U.S. Cl. X.R.

60—39.49, 39.71, 39.77; 62—51